(12) United States Patent
Krusell et al.

(10) Patent No.: US 10,861,030 B2
(45) Date of Patent: Dec. 8, 2020

(54) SYSTEMS AND METHODS QUANTIFYING TRUST PERCEPTIONS OF ENTITIES WITHIN SOCIAL MEDIA DOCUMENTS

(71) Applicant: TSG Technologies, LLC, St. Louis, MO (US)

(72) Inventors: Noah Krusell, Chesterfield, MO (US); Caimei Lu, Kirkwood, MO (US); Jay Harrison, Ballwin, MO (US)

(73) Assignee: TSG Technologies LLC, St. Louis, MO (US)

( * ) Notice: Subject to any disclaimer, the term of this patent is extended or adjusted under 35 U.S.C. 154(b) by 556 days.

(21) Appl. No.: 14/475,813

(22) Filed: Sep. 3, 2014

(65) Prior Publication Data
US 2015/0066958 A1 Mar. 5, 2015

Related U.S. Application Data

(60) Provisional application No. 61/873,925, filed on Sep. 5, 2013.

(51) Int. Cl.
*G06F 17/00* (2019.01)
*G06Q 30/02* (2012.01)

(52) U.S. Cl.
CPC ................ *G06Q 30/0204* (2013.01)

(58) Field of Classification Search
CPC ................................ G06Q 30/0204
See application file for complete search history.

(56) References Cited

U.S. PATENT DOCUMENTS

| | | | | |
|---|---|---|---|---|
| 2008/0270209 A1* | 10/2008 | Mauseth | ............... | G06Q 10/10 705/7.29 |
| 2013/0054502 A1* | 2/2013 | Fano | ....................... | G06N 5/02 706/46 |

OTHER PUBLICATIONS

Breiman, Leo "Random Forests" Statistics Department, University of California, Jan. 2001, 33 pages.
Covello, Vincent T. "Risk and Crisis Communication: Communicating Effectively in High Concern, High Stress, or Low Trust Situations" Center for Risk Communication, New York, New York (no date available), 73 pages.
Peters, Richard G. et al. "The Determinants of Trust and Credibility in Environmental Risk Communication: An Empirical Study" Risk Analysis, vol. 17, No. 1 (1997), pp. 43-54.
Slovic, Paul "Trust, Emotion, Sex, Politics, and Science: Surveying the Risk-Assessment Battlefield" Risk Analysis, vol. 19, No. 4 (1999), pp. 689-701.

* cited by examiner

*Primary Examiner* — Hau H Hoang
(74) *Attorney, Agent, or Firm* — Polsinelli PC

(57) ABSTRACT

A computer system measures trust of an entity in electronic documents from electronic media sources is described. A communication network is linked to one or more of the sources. A computer server is in communication with the communication network and is configured to receive electronic documents via the communication network. The computer server having a memory and a processor accessing a database. The memory includes processor executable instructions stored in the memory and executable by the processor. The computer executable instructions comprise preliminary term vector instructions, calculating instructions for determining the preliminary term vectors in the received electronic documents, and refined term vector instructions for defining a plurality of industry-specific term vectors.

16 Claims, 4 Drawing Sheets

SYSTEMS AND METHODS QUANTIFYING TRUST PERCEPTIONS OF ENTITIES WITHIN SOCIAL MEDIA DOCUMENTS

BACKGROUND

This section provides background information related to the present disclosure which is not necessarily prior art.

Trust is an essential asset in business. When a business can earn the trust of its customers or shareholders, it also gains increased revenues, decreased customer acquisition and retention costs, and more operational latitude with strategic partners. Additionally, trusted firms are buffered from negative outcomes and are more resilient in times of crisis.

With the proliferation of social media, consumers have learned to turn to each other for advice on companies to patronize or avoid. Socially-enabled consumers value and trust each other's experiences and advice over advertisements, corporate propaganda released by the company, and other services which purport to publish unbiased reviews. Social media offers a vast resource for businesses to determine how well they are trusted by their customers. The degree of trust needs to be quantified numerically with standardized algorithms or other analysis scenarios in order to establish benchmarks, make comparisons with other companies, detect changes in trust through time, and set goals for improvement. These can then be implemented in planning for marketing and communications.

SUMMARY

This section provides a general summary of the disclosure, and is not a comprehensive disclosure of its full scope or all of its features.

In one form, a computer system for measuring trust of an entity in electronic documents from electronic media sources is described. A communication network is linked to one or more of the sources. A computer server is in communication with the communication network and is configured to receive electronic documents via the communication network. The computer server having a memory and a processor accessing a database. The memory includes processor executable instructions stored in the memory and executable by the processor. The computer executable instructions comprise:

preliminary term vector instructions for defining a plurality of preliminary term vectors which correspond to trust factors and which are indicative of trust, said preliminary term vector instructions for storing the preliminary term vectors and the trust factors in the database;

calculating instructions for determining the preliminary term vectors in the received electronic documents and for calculating a preliminary trust score for an entity based on the preliminary term vectors determined to be in the received electronic documents; and refined term vector instructions for defining a plurality of industry-specific term vectors related to the entity and indicative of trust and for storing the industry-specific term vectors in the database;

wherein the calculating instructions for calculating a final trust score for the entity based on the preliminary term vectors determined to be in the received electronic documents and based on the industry-specific term vectors and determined to be in the received electronic documents.

In another form, a non-transitory computer readable storage medium for use with a computer system is described.

In another form, a computer executable storage method for measuring trust of an entity in electronic documents from electronic media sources is described.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
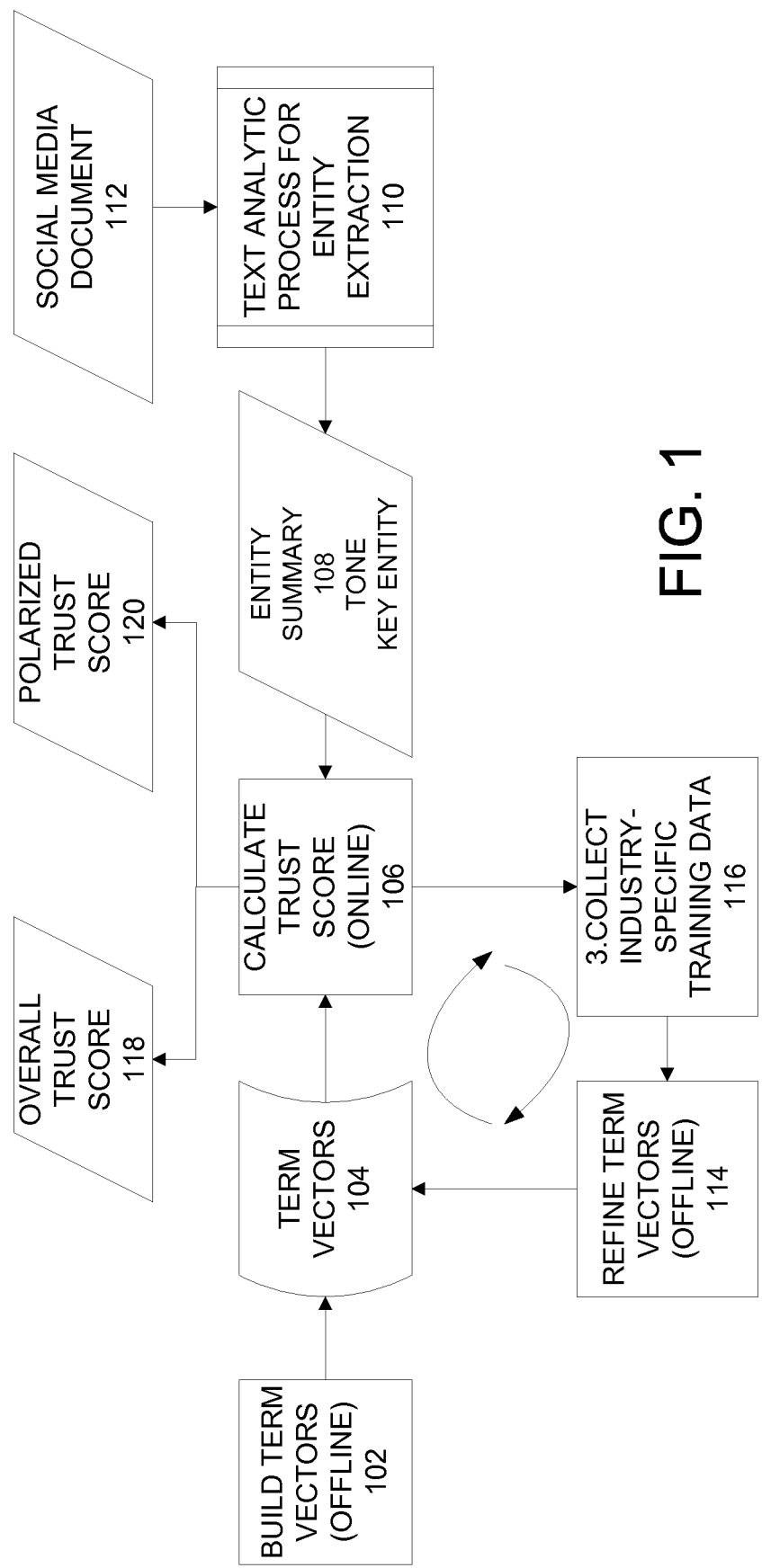
FIG. 1 is a flow diagram illustrating a method for measuring trust indicated in electronic documents according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Methods and systems described herein develop an industry-specific composite trust score that is comprised of measurements of different facets of trust that are expressed in social media. These measurements can be applied automatically in real time to social media articles to instantly measure the different factors of trust, from which an overall trust metric can also be calculated.

Figure 2:
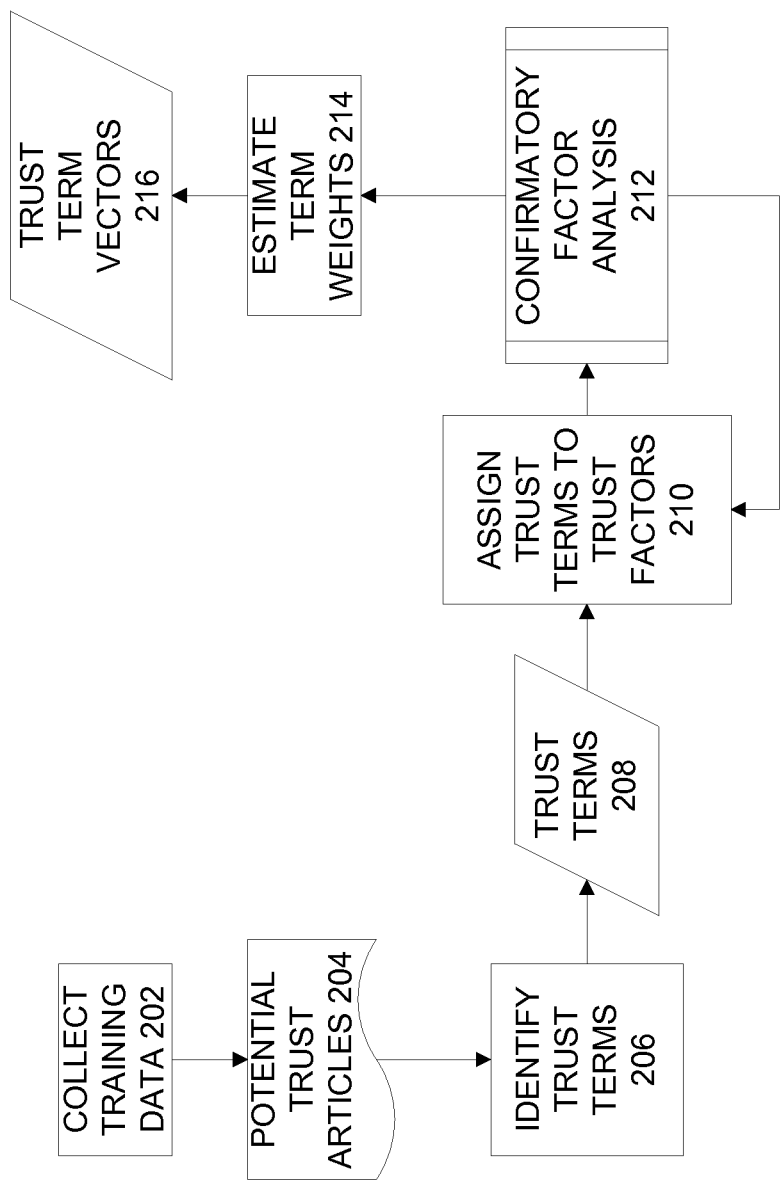
FIG. 2 is a flow diagram illustrating a method for building term vectors in the flow diagram of FIG. 1 for use in measuring trust indicated in electronic documents according to one example embodiment of the present disclosure.

FIG. 1 is a flow diagram illustrating a processor executable system and method of processor executable instructions for measuring trust indicated in electronic documents according to one example embodiment of the present disclosure. Initially, a preliminary term vector is built for each trust factor at 102 based on the seed terms indicating trust and the training articles collected through the seed terms. One example embodiment of the processor executable method of building term vectors 102 is illustrated in FIG. 2.

After the preliminary term vectors 104 are created offline at 102 and stored in a term vector database 304 (see FIG. 3), processor executable instructions, such as an algorithm or other analysis scenarios, calculate at 106 a preliminary trust score in real-time for entities 108 extracted by text analytics 110 from social media articles 112 coming into the system as streaming data.

In one form, it is contemplated that the preliminary term vectors 104 could be generated by processor executable instructions including at least one of the following: instructions for identifying potential trust articles from social media, instructions for identifying terms used frequently in social media that are associated with trust, instructions for making putative assignments of individual terms to trust factors, instruction for applying confirmatory factor analysis to quantify relationships of words to trust factors, and instructions for estimating the strengths of the relationships between terms and their assigned trust factors.

An entity can be a company, a person, a brand, or a product. Entities are extracted from the textual content of social media articles using the text analytic tool 110 for entity extraction. In one form, this tool 110 is configured to extract entities, and may also extract a summary of the sentences related to the entities in an article. The preliminary trust score is calculated based on the content of the entity summaries instead of the whole article to generate an entity-specific trust score. In addition, the text analytic tool 110 may be configured to also output whether an entity is a key entity in each article (primarily related to the main topic of the article), and the tone (negative, neutral or positive) that the entity is mentioned in the article, which are also integrated into the trust score calculation.

The preliminary term vectors 104 which are initially built offline are generic and not specific to any industry or field. One goal of the systems and methods described herein is to develop industry-specific term vectors (i.e., refined term vectors 114) by collecting and evaluating industry specific training data 116. One reason is that some terms indicating trust in one industry may not be informative of trust in another industry. To build industry-specific term vectors for each industry, a set of training data is collected at 116 with trust scores already calculated using the preliminary term vectors 104. Then, the preliminary term vectors 104 are refined at 114 based on the industry-specific training data 116.

Building Term Vectors—FIG. 2

The preliminary term vectors are used for calculating the scores for individual trust factors. The preliminary term vectors are constructed though several steps in a system employing a processor executable method, such as illustrated in FIG. 2, which is an example of one form of construction.

Collecting Potential Trust Articles From Social Media 202

In one form, training begins at 202 of FIG. 2 by collecting potential trust articles, such as from social media. For example, trust in risk communication can be considered to have a discrete number of factors. In this disclose, four factors are used for exemplary purposes; however, it is contemplated that more or less than four factors may be used. In the example herein the four factors are: caring and empathy, honesty and openness, competence and expertise, and commitment and dedication. Of these, it is assumed for exemplary purposes that the most important factor in establishing trust is caring and empathy (see Peters, R. G., Covello, V. T., and McCallum, D. B., "The determinants of trust and credibility in environmental risk communication: An empirical study," *Risk Analysis* 17(1): 43-54 (1997)). Based on these exemplary assumptions, four sets of term queries are developed by an operator, each of which is composed of the words and phrases related to one of the four factors of trust. The queries are submitted to a search engine to find relevant articles from a database which contains millions of indexed social media documents of a variety of topics. Top relevant articles returned by the search engine are collected at 204 as training data of potential trust articles. It is contemplated that other techniques and other trust factors may be used to collect training data.

Identifying Trust Terms 206

At 206, the potential trust articles are analyzed to find the terms that have high frequencies of occurrence. From those terms, a linguistic analyst judges whether each term has a meaning, literal or implied, that is indicative of a trusting relationship within the industry. Alternatively, or in addition, processor executable instructions may be used to judge each term. The terms that meet criteria of both high frequency and a relationship with trust are retained for further analysis at 208 in the term vector database 304. Then, this list of terms to be examined is expanded, either by processor executable instructions or by an analyst. For example, words that could act as nouns or verbs are treated as verbs. For the verbs, the list is expanded to include the first- and third-person present tense, the past tense, and the present participle. Contracted negations for verbs are included as well, when appropriate. For nouns, the singular and plural forms are included. For adjectives, the corresponding adverbs are included. Exceptions to these guidelines are applied to words that have other meanings outside of the trust context. In subsequent steps, occurrences of a root word, as well as occurrences of its other forms, are added together and treated as one term for analysis.

Assigning Trust Terms to Trust Factors 210

At 210, the trust terms obtained from above steps are assigned to each of the four factors based on human judgment and/or automatic statistical analysis by processor executable instructions. For example, putative assignments of individual terms to trust factors are made by human analysts based on subjective judgment. Then the appropriateness of these assignments is examined using a statistical analysis such as confirmatory factor analysis at 212. The total frequencies of the selected trust terms in corresponding training documents are first assembled in a document term matrix. The matrix is then used in automated calculations for the confirmatory factor analysis model, in which four latent variables representing the four trust factors are assumed to be measured with their assigned terms. The latent variables are assumed to be uncorrelated with each other. An iterative processor executable method is used by systems described herein to apply the model, obtain diagnostic statistics, improve the fit of the model by dropping terms with non-significant or negative factor loadings or by reassigning trust terms to different latent variables, and/or reapply the model. This analysis is continued until a model with satisfactory agreement with the data is achieved.

Estimating the Strengths of the Relationships Between Terms and Their Assigned Trust Factors 214

The final step of building term vectors involves a measure of the degree of attachment of a term to its assigned trust factor in the final confirmatory factor analysis model obtained from the iterative processor executable method and system. For this, $R^2$ values are calculated from the revised confirmatory factor analysis model. $R^2$ values indicate the proportion of variation in the term that can be explained by its relationship with its associated trust factor. $R^2$ values range between 0 and 1, with larger values indicating stronger relationships. At 214, the $R^2$ values are used as the weights of the trust terms in the four term vectors corresponding to the four trust factors, resulting in industry-specific trust term vectors at 216 which are stored in database 304.

Real-Time Trust Score Calculation 106

One purpose of calculating a real-time trust score calculation using the processor executable systems and methods disclosed herein is to develop an algorithm or analysis scenario to mathematically assess the degree by which an entity summary is associated with a trust factor.

Calculating Trust Factor Score:

After a trust factor term vector is developed for each trust factor f, given an entity summary s, a trust score can be calculated based on how many terms in f can be matched in s. Specifically, s can also be represented with term vector with elements as the frequencies of the terms in s. Then, the cosine similarity between the summary term vector and the trust factor term vector can be calculated as:

$$\mathrm{Score}(s, f) = \frac{V(s) \cdot V(f)}{|V(s)||V(f)|}$$

The cosine similarity is actually the normalized dot product of the two vectors. Therefore, it is comparable between different summaries and factors.

For efficiency in one form in the example disclosed herein, only the terms included in a factor vector are used in the summary term vector. Each term is weighted by the $R^2$ value noted above. This results in the following scoring formula:

$$\mathrm{Score}(s, f) = \frac{\sum_{t \, in \, f} [tf(t \text{ in } s) \cdot \mathrm{weight}(t \text{ in } f)]}{\mathrm{factor\_norm} \cdot \mathrm{summary\_norm}}$$

$$\mathrm{factor\_norm} = \frac{1}{\sqrt{\sum_{t \, in \, f} \mathrm{weight}(t \text{ in } f)^2}}$$

$$\mathrm{summary\_norm} = \frac{1}{\sqrt{\sum_{t \, in \, f} tf(t \text{ in } s)^2}}$$

where:

tf(t in s) is the frequency of term t in summary s, that is the number of times term t appears in the currently scored entity summary s.

weight(t in f) is the weight of vector term t in factor f. This is actually the $R^2$ value calculated when the term vectors are developed. Based on this formula, summaries containing terms with higher weight will have higher trust scores. The factor_norm and summary_norm standardize the trust score to a value between 0 and 1, making the score between the four trust factors comparable.

Refining Trust Factor Score With Boosts

To improve the validity of the computed trust score, it is also contemplated in one form of the systems and methods disclosed herein that the scoring formula can be further refined based on entity and article features. For example, $$\text{Score}(s, f) = \frac{\sum_{t \text{ in } f} [tf(t \text{ in } s) \cdot \text{weight}(t \text{ in } f)]}{\text{factorNorm} \cdot \text{summaryNorm}} \cdot$$

$$\text{diverseBoost}(s, f) \cdot \text{keyEntityBoost}(s, d) \cdot \text{docBoost}(d)$$

diversityBoost (s, f) is a boost to reward summaries containing more factor terms. The value of the boost is larger when more factor terms are matched in the entity summary. It is based on the assumption that the entity summaries containing more factor terms are more likely to have relevant information about a trust factor.

The diversity boost is calculated as follows:

$$\text{diversityBoost}(s, f) = 2^{\frac{n(f,s)}{\text{len}(f)}}$$

where $n_t$ is the number of vector terms from factor f that are matched in summary s; len(f) is the length or the total number of terms in factor f. The range of diversity boost is between 1 and 2.

keyEntityBoost(s, d) is a boost to reward summaries extracted for a key entity in an article. Key entity means an entity is directly related to the main subject of the article instead of merely briefly mentioned in the article. The information about key entity is provided by the same text analytic tool used for extracting entity sentiment and entity summary. The value of the key entity boost can be calculated as follows:

keyStakeholderBoost(s, d)=1, if key stakeholder is True;
keyStakeholderBoost(s, d)=0. 6, if key stakeholder is False;

docBoost(d) is an article (document) level boost. One purpose of this boost is to penalize articles whose content is less authoritative and persuasive. This boost value can encapsulate several article features, such as:

- Article media type: for instance, news articles get higher article boost value than micro blogs.
- Article readability: articles with higher readability get higher boost value. An article with higher readability is expected to be read by more people and thus is more persuasive. Many metrics for measuring the readability of text have been proposed in existing research. For example, Flesch Reading Ease Score may be used as the measure of article readability, but other readability metrics can be easily applied by the systems and methods disclosed herein, such as Coleman-Liau Index, Gunning Fog Index, Automated Readability Index, etc.
- Article credibility: This feature checks whether an article is a spam or advertisement. Automatic text analytic analysis may be used to check whether an article is a spam or advertisement. If so, the article credibility boost value is assigned to 0.

Adding boosts to the cosine similarity based trust factor formula changes the range of original trust factor score. In order to get a standard trust score, based on the distribution of different boost values, the boosted trust factor scores are normalized to a certain range (e.g. 0 to 10).

Calculating Overall Trust Score 118

After receiving the scores for each of the four trust factors, the four scores are linearly combined to generate an overall trust score 118. The overall trust score an entity gets from summary s is calculated as:

Overall Trust Score(s)=α*Score(s, $f_{caring}$)+β*Score(s, $f_{honest}$)+γ*Score(s, $f_{competence}$)+δ*Score(s, $f_{commitment}$)

α, β, γ, and δ are the weights assigned to the four trust factors: Caring & Empathy, Honesty & Openness, Competence & Expertise, and Commitment & Dedication. These weights can be tuned based on empirical data or existing research. By assigning weights having positive values with a sum of 1, the overall trust score is standardized to the same range as the trust factor score. As an example, fifty percent of an entity's credibility may be assumed to depend on whether the entity is perceived as caring and empathetic. In this example, α is set to ½, and β, γ, δ can be equally set to ⅙, or some other corresponding value. As a result, the overall trust score is standardized to the same range as the trust factor score.

Polarized Trust Score

The above overall trust score 118 indicates whether and to what extent an entity is described with terms associated with trust factors in social media articles. To further indicate whether an entity is described as trustworthy or not trustworthy, polarity may be introduced into the trust score by relying on the entity tone calculated by the text analytic tool to calculate a polarized trust score 120. As mentioned above, the text analytic tool also outputs entity sentiment information, namely whether an entity is positively, neutrally or negatively mentioned in an article. If it is positively or neutrally mentioned, then its trust score is unchanged by multiplying by +1. Otherwise, the overall trust score is multiplied by −1. In this way, it is assumed that if an entity is negatively mentioned in a summary, then it is described as untrustworthy in the summary, and the absolute value of the trust score tells the degree that it is perceived as untrustworthy.

Polarized Trust Score(s) =
$$\begin{cases} 1 * \text{Overall Trust Score}, & \text{IF Tone(s) is Positive or Neutral} \\ -1 * \text{Overall Trust Score}, & \text{IF Tone(s) is Negative} \end{cases}$$

The range of the polarized trust score depends on the maximum possible value of the overall trust score. For instance, if the overall trust score ranges from 0 to 10, then the polarized trust score ranges from −10 to 10.

Developing Industry-Specific Term Vectors

Figure 4:
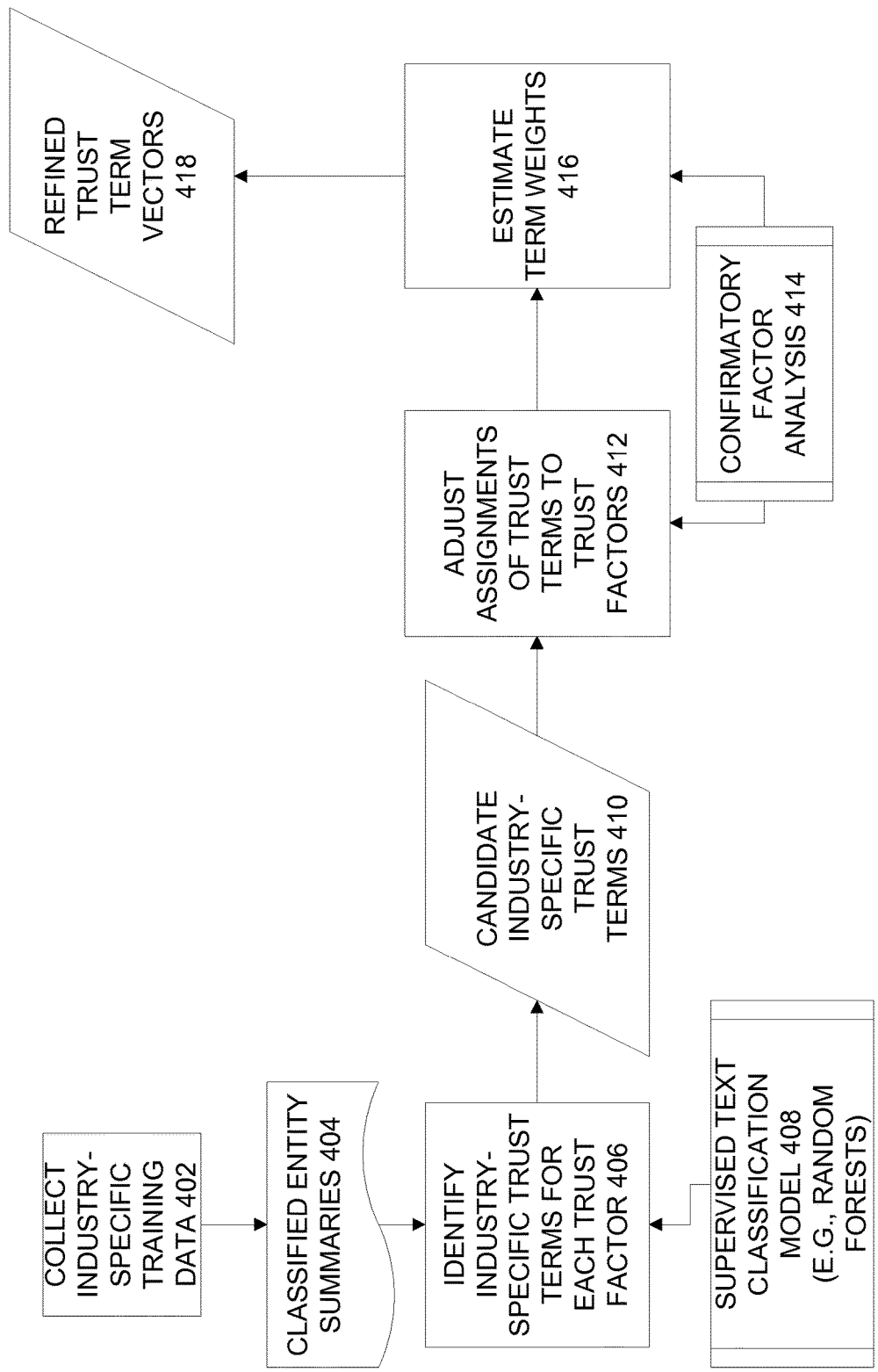
FIG. 4 is a flow diagram illustrating a method to refine the generic term vectors to build industry-specific term vectors according to one example embodiment of the present disclosure.

One purpose of the processor executable methods and system disclosed herein is to refine the preliminary term vectors to build industry-specific term vectors. FIG. 4 is a flow diagram illustrating a processor executable method employed by a system to refine the preliminary term vectors illustrated in FIG. 1 by building industry-specific term vectors according to one example embodiment of the present disclosure. It is contemplated that the industry-specific term vectors are used at 106 in calculating the trust scores at 118, 120 of FIG. 1. The industry-specific term vectors may be used in combination with some or all of the preliminary term vectors built at 102 of FIG. 1. Alternatively, the industry-specific term vectors may be used instead of the preliminary term vectors when calculating the trust score.

Collecting Industry-Specific Training Data 116

Initially, industry-specific training data 402 such as selected articles or other resources are collected. Entity summaries for the collected articles are classified at 404. To build industry-specific term vectors, for each industry, a set of entity summaries is collected at 402 with trust scores already calculated using the preliminary term vectors 104 stored in the term vector database 304. These scored entity summaries are used as training data. For example in one form, the summaries may be classified at 404 into five categories based on their scores to each trust factor:

Summaries with Caring & Empathy as the primary trust factor;
Summaries with Honest & Openness as the primary trust factor;
Summaries with Competence & Expertise as the primary trust factor;
Summaries with Commitment & Dedication as the primary trust factor; and
Summaries with none of the trust factors.

If a factor is the primary trust factor of a summary, it means its score is higher than other factors (e.g. at least twice of the others) or it is the only factor with non-zero score. Summaries with none of the trust factors are those which have zero scores for all the trust factors.

Refining Term Vectors With Industry-Specific Terms 114

Once the training summaries are classified into the five categories, a supervised text classification model 408 such as Random Forests is applied (see Breiman, L., "Random forests," *Machine Learning* 45(1): 5-32 (2001)). Although Random Forests are usually used to classify unseen data, in this context it is used to learn the importance of terms to a category. The local importance of each term on a training summary is first obtained from the Random Forest. Then the importance of a term to a category is calculated as the average of its local importance on all the summaries classified into that category. The terms having the highest averages are retained as candidate terms 410 to be added to the term vector of corresponding trust factors.

Next, the assignment of trust terms to trust factors is adjusted at 412. For a candidate term 410 to be added to the term vector of a trust factor, it should additionally satisfy a further requirement that the term have high frequency among the training summaries for that trust factor (although this is optional and not necessary).

Optionally, a candidate term 410 should make notional sense. That is, it should be conceptually-aligned with that trust factor. This is a different requirement from the high frequency requirement. Terms with high frequency may not be conceptually related to the trust factor to which they are assigned. Terms with high frequency need to be re-checked (either manually and/or by processor analysis) to make sure they are conceptually-aligned with the trust factor.

Confirmatory factor analysis 414 is applied to ensure relevance of the added terms to their assigned factors. The terms satisfying all these requirements are added to the corresponding preliminary term vectors to create industry-specific term vectors 418. The comparative fit index values (e.g., $R^2$ values ranging from 0 to 1) generated by the confirmatory factor analysis 414 are used as the weights 416 for added terms. Based on the term vectors customized with industry-specific training data, more accurate trust scores can be calculated for entities of a certain industry. The industry term vector refinement of the processor executable methods and systems disclosed herein can be repeated for several iterations until reaching a satisfactory level.

Thus, in one form, the refined trust term vectors 418 are generated by processor executable instructions including instructions for limiting the term vectors of each trust factor to the term vectors having a higher frequency among the received training summaries for that trust factor, and instructions for applying confirmatory factor analysis to quantify relationships of words to trust factors and estimating the strengths of the relationships between terms and their assigned trust factors.

Figure 3:
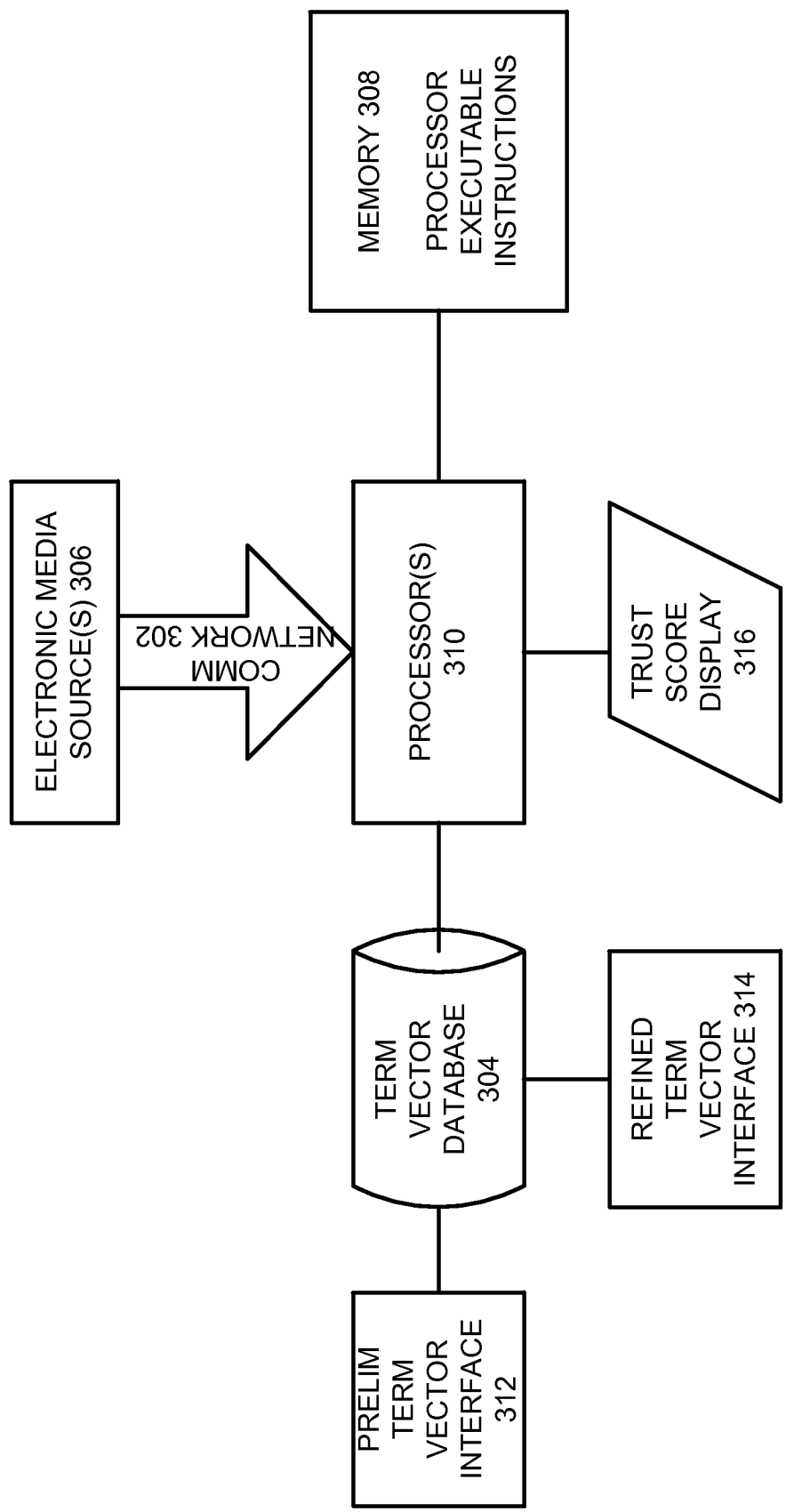
FIG. 3 is a block diagram illustrating a system for measuring trust indicated in electronic documents from an electronic media source according to one example embodiment of the present disclosure.

Referring to FIG. 3, one example of a block diagram of a computer system for measuring trust indicated in electronic documents from an electronic media source according to one example embodiment of the present disclosure is illustrated. A communication network 302 is linked to one or more of the electronic media sources 306, such as social media. A database 304 for storing term vectors and/or other data is linked to a computer server having a memory 308 and one or more processors 310 in communication with the communication network, the computer server configured to receive electronic documents via the communication network 302. The memory 308 stores the processor executable instructions noted herein for execution by the processor(s) 310.

For example, the processor(s) 310 executes preliminary term vector instructions which may be in the form of an interface 312 for receiving (from offline analysis) a plurality of preliminary term vectors which correspond to trust factors and which are indicative of trust. The preliminary term vectors may be provided by an administrator. The preliminary term vector instructions direct the processor(s) 310 to store the received preliminary term vectors and the trust factors in the database 304. Alternatively or in addition, the preliminary term vector interface 312 may be processor executable instructions which are executed by the processor(s) 310 for generating the preliminary term vectors for the trust factors for storage in the database 304.

The processor(s) 310 also executes calculating instructions for determining the preliminary term vectors in the received electronic documents form the electronic mead source(s) 306 via the communications network 302. The processor(s) 310 also executes calculating instructions for calculating, providing, and displaying a preliminary trust score on a display 316 for an entity based on the preliminary term vectors determined to be in the received electronic documents.

It is also contemplated that the processor(s) 310 executes refined term vector instructions which may be in the form of an interface 314 for receiving (from offline analysis) a plurality of industry-specific term vectors related to the entities and indicative of trust. The industry-specific term vectors may be provided by an administrator. The refined term vector instructions also direct the processor(s) 310 to store the industry-specific term vectors in the database 304. Alternatively or in addition, the refined term vector interface 314 may be processor executable instructions which are executed by the processor(s) 310 for generating the industry-specific term vectors and the trust factors for storage in the database 304.

The processor(s) 310 also executes calculating instructions for calculating a final trust score 316 for an entity based on the preliminary term vectors determined to be in the received electronic documents and based on the industry-specific term vectors and determined to be in the received electronic documents.

Further, the example methods disclosed herein may be implemented as computer-executable instructions. These computer-executable instructions may be stored on a non-transitory computer readable medium. In this way, the methods may be implemented in a computer program product stored on a computer readable medium. The computer readable medium may include for example, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, including molecular memory ICs, or any type of system or device suitable for storing instructions and/or data.

For example, the non-transitory computer readable medium may include instructions for generating statistical data from one or more training documents, creating at least one topic model-based classification rule using the statistical data, and creating at least one query-based classification rule using one or more user defined categories and the statistical data. The instructions stored on the non-transitory computer readable medium may then be employed in a system (e.g., the system 800) to classify an electronic document from an electronic media source.

The documents disclosed herein may include any suitable electronic document representing, for example, social media articles (e.g., a blog, a message, etc.), news articles (print or electronic), emails, etc. Additionally, the electronic media sources disclosed herein may include any suitable electronic media source including, for example, social media, news outlets, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A computer system for measuring trust of an entity in electronic documents from electronic media sources, the computer system comprising:
   a communication network linked to one or more of the sources;
   a database; and
   a computer server in communication with the communication network, the computer server configured to receive electronic documents via the communication network;
   the computer server having a memory and a processor accessing the database, the memory including processor executable instructions stored in the memory and executable by the processor, the instructions comprising:
   preliminary term vector instructions for defining a plurality of preliminary term vectors having terms which correspond to trust factors and which are indicative of trust, the preliminary term vector instructions for storing the preliminary term vectors and the trust factors in the database;
   calculating instructions for determining the preliminary term vectors in the received electronic documents and for calculating a preliminary trust score in real-time for an entity based on the preliminary term vectors determined to be in the received electronic documents, the entity comprising one of a company, a person, a brand, and a product extracted from textual content of the received electronic documents;
   refined term vector instructions for defining, training, and using machine learning to continually refine a plurality of industry-specific term vectors for each industry having terms related to the entity and indicative of trust and for storing the continually refined industry-specific term vectors in the database, receiving training summaries, applying a supervised text classification model to the defined training summaries, limiting the term vectors of each trust factor to the term vectors having a higher frequency among the received training summaries for that trust factor, and applying confirmatory factor analysis to quantify relationships of words to trust factors and estimating the strengths of the relationships between terms and their assigned trust factors; and
   displaying instructions for displaying on a display, the preliminary trust score updating on the display in real-time, based on the preliminary term vectors determined to be in the received electronic documents;
   the calculating instructions including developing a trust factor term vector for each trust factor f, and calculating a final trust score that indicates a current degree of trustworthiness for the entity on social media using entity sentiment information for each electronic document that indicates whether the entity is positively, neutrally, or negatively mentioned, based on the preliminary term vectors having terms determined to be in the received electronic documents and based on the industry-specific term vectors having terms determined to be in the received electronic documents, calculating a trust score for each trust factor based on how many terms in each trust factor term vector can be matched to an entity summary term vector s and calculating a cosine similarity between the entity summary term vector s and the trust factor term vector f according to the following:

$$\text{Score}(s, f) = \frac{V(s) \cdot V(f)}{|V(s)||V(f)|}.$$

2. The system of claim 1 wherein the preliminary term vector instructions comprise an interface for receiving the preliminary term vectors provided by an administrator.

3. The system of claim 1 wherein the refined term vector instructions comprise an interface for receiving industry-specific term vectors provided by an administrator.

4. The system of claim 1 wherein the calculating instructions comprise instructions for using only terms t included in a trust factor term vector f in the entity summary term vector s to calculate the trust score Score (s, f) for the electronic documents, according to the following scoring formulae:

$$\text{Score}(s, f) = \frac{\sum_{t \, in \, f} [tf(t \text{ in } s) \cdot \text{weight}(t \text{ in } f)]}{\text{factor\_norm} \cdot \text{summary\_norm}}$$

$$\text{factor\_norm} = \frac{1}{\sqrt{\sum_{t \, in \, f} \text{weight}(t \text{ in } f)^2}}$$

$$\text{summary\_norm} = \frac{1}{\sqrt{\sum_{t \, in \, f} tf(t \text{ in } s)^2}}$$

Wherein:
tf (t in s) is the frequency of vector term t in summary s, that is the number of times term t appears in the currently scored entity summary s; and
weight(t in f) is the weight of vector term t in factor f.

5. The system of claim 4 wherein the calculating instructions comprise instructions for adjusting the trust score Score (s, f) by multiplying it by one or more of the following:
(1) a diversity boost is calculated as follows:

$$diversityBoost(s, f) = 2^{\frac{n(f,s)}{len(f)}}$$

where $n_t$ is the number of vector terms from factor f that are matched in summary s; and
len(f) is the length or the total number of terms in factor f, and wherein a range of the diversity boost is between 1 and 2;
(2) a key entity boost calculated as follows:
keyStakeholderBoost(s, d)=1, if key stakeholder is True;
keyStakeholderBoost(s, d)=0.6, if key stakeholder is False; and
(3) a docBoost(d) indicating a level boost for certain documents based on their authoritative and/or persuasive value as compared to other documents wherein a range of the docboost is between 0 and 1.

6. The system of claim 5 wherein the calculating instructions comprise instructions for calculating an overall total score by calculating a weighted sum of the trust scores for the entity summary s for each of four trust factors f defined as (1) Caring & Empathy, (2) Honesty & Openness, (3) Competence & Expertise, and (4) Commitment & Dedication, according to the following:

Overall Trust Score(s)=α*Score(s, $f_{caring}$)+β*Score (s, $f_{honest}$) +γ*Score(s, $f_{competence}$)+δ*Score(s, $f_{commitment}$)

Wherein α, β, γ, and δ are weights assigned to the four trust factors: $f_{caring}$=Caring & Empathy, $f_{honest}$=Honesty & Openness, $f_{competence}$=Competence & Expertise, and $f_{commitment}$=Commitment & Dedication.

7. The system of claim 6 wherein the preliminary term vector instructions comprise weighting instructions for indicating the strengths of the relationships between terms and their assigned trust factors.

8. The system of claim 4 wherein the calculating instructions comprise instructions for calculating a polarized trust score by assigning a positive value to a trust score of an entity having a positive tone and by assigning a negative value to a trust score of an entity having a negative tone.

9. The system of claim 1 wherein the preliminary term vector instructions comprise instructions for at least one of the following: identifying potential trust articles from social media, identifying terms used frequently in social media that are associated with trust, making putative assignments of individual terms to trust factors, applying confirmatory factor analysis to quantify relationships of words to trust factors, and estimating the strengths of the relationships between terms and their assigned trust factors.

10. A non-transitory computer readable storage medium for use with a computer system for measuring trust of an entity in electronic documents from electronic media sources, wherein the computer system includes a communication network linked to one or more of the sources, a database, and a computer server in communication with the communication network and the database, the computer server configured to receive electronic documents via the communication network, the computer server having a processor accessing the database, the non-transitory computer readable storage medium including processor executable instructions stored in the memory and executable by the processor, the instructions comprising:

preliminary term vector instructions for defining a plurality of preliminary term vectors having terms which correspond to trust factors and which are indicative of trust, the preliminary term vector instructions for storing the preliminary term vectors and the trust factors in the database;

calculating instructions for determining the preliminary term vectors in the received electronic documents and for calculating a preliminary trust score in real-time for an entity based on the preliminary term vectors determined to be in the received electronic documents, the entity comprising one of a company, a person, a brand, and a product extracted from textual content of the received electronic documents;

refined term vector instructions for defining, training, and using machine learning to continually refine a plurality of industry-specific term vectors having terms related to the entity and indicative of trust and for storing the continually refined industry-specific term vectors in the database, receiving training summaries, applying a supervised text classification model to the defined training summaries, limiting the term vectors of each trust factor to the term vectors having a higher frequency among the received training summaries for that trust factor, and applying confirmatory factor analysis to quantify relationships of words to trust factors and estimating the strengths of the relationships between terms and their assigned trust factors; and displaying instructions for displaying on a display, the preliminary trust score updating on the display in real-time, based on the preliminary term vectors determined to be in the received electronic documents;

the calculating instructions including developing a trust factor term vector for each trust factor f, and calculating a final trust score that indicates a current degree of trustworthiness for the entity on social media using entity sentiment information for each electronic document that indicates whether the entity is positively, neutrally, or negatively mentioned, based on the preliminary term vectors having terms determined to be in the received electronic documents and based on the industry-specific term vectors having terms determined to be in the received electronic documents, calculating a trust score for each trust factor based on how many terms in each trust factor term vector can be matched to an entity summary term vector s and calculating a cosine similarity between the entity summary term vector s and the trust factor term vector f according to the following:

$$Score(s, f) = \frac{V(s) \cdot V(f)}{|V(s)||V(f)|}.$$

11. The medium of claim 10 wherein the calculating instructions comprise instructions for using only terms t included in a trust factor term vector f in the entity summary term vector s to calculate the trust score Score (s, f) for the electronic documents, according to the following scoring formulae:

$$\text{Score}(s, f) = \frac{\sum_{t \text{ in } f} [tf(t \text{ in } s) \cdot \text{weight}(t \text{ in } f)]}{\text{factor\_norm} \cdot \text{summary\_norm}}$$

$$\text{factor\_norm} = \frac{1}{\sqrt{\sum_{t \text{ in } f} \text{weight}(t \text{ in } f)^2}}$$

$$\text{summary\_norm} = \frac{1}{\sqrt{\sum_{t \text{ in } f} tf(t \text{ in } s)^2}}$$

Wherein:
tf (t in s) is the frequency of vector term t in summary s, that is the number of times term t appears in the currently scored entity summary s; and
weight(t in f) is the weight of vector term t in factor f.

12. The medium of claim 11 wherein the calculating instructions comprise instructions for adjusting the trust score Score (s, f) by multiplying it by one or more of the following:
(1) a diversity boost is calculated as follows:

$$\text{diversityBoost}(s, f) = 2^{\frac{n(f,s)}{len(f)}}$$

where $n_t$ is the number of vector terms from factor f that are matched in summary s; and
len(f) is the length or the total number of terms in factor f, and wherein a range of the diversity boost is between 1 and 2;
(2) a key entity boost calculated as follows:
keyStakeholderBoost(s, d)=1, if key stakeholder is True;
keyStakeholderBoost(s, d)=0.6, if key stakeholder is False; and
(3) a docBoost(d) indicating a level boost for certain documents based on their authoritative and/or persuasive value as compared to other documents wherein a range of the docboost is between 0 and 1.

13. The medium of claim 12 wherein the preliminary term vector instructions comprise weighting instructions for indicating the strengths of the relationships between terms and their assigned trust factors.

14. The medium of claim 11 wherein the calculating instructions comprise instructions for calculating a polarized trust score by assigning a positive value to a trust score of an entity having a positive tone and by assigning a negative value to a trust score of an entity having a negative tone.

15. A computer executable storage method for measuring trust of an entity in electronic documents from electronic media sources, wherein a communication network is linked to one or more of the sources; the method including processor executable instructions stored on a non-transitory computer readable storage medium and executable by a processor, the method comprising:
preliminary term vector instructions for defining a plurality of preliminary term vectors having terms which correspond to trust factors and which are indicative of trust, the preliminary term vector instructions for storing the preliminary term vectors and the trust factors in a database;
calculating instructions for determining the preliminary term vectors in the received electronic documents and for calculating a preliminary trust score in real-time for an entity based on the preliminary term vectors determined to be in the received electronic documents, the entity comprising one of a company, a person, a brand, and a product extracted from textual content of the received electronic documents;
refined term vector instructions for defining, training, and using machine learning to continually refine a plurality of industry-specific term vectors having terms related to the entity and indicative of trust and for storing the continually refined industry-specific term vectors in the database, receiving training summaries, applying a supervised text classification model to the defined training summaries, limiting the term vectors of each trust factor to the term vectors having a higher frequency among the received training summaries for that trust factor, and applying confirmatory factor analysis to quantify relationships of words to trust factors and estimating the strengths of the relationships between terms and their assigned trust factors;
displaying instructions for displaying on a display, the preliminary trust score updating on the display in real-time, based on the preliminary term vectors determined to be in the received electronic documents; and
developing a trust factor term vector for each trust factor f and calculating a final trust score that indicates a current degree of trustworthiness for the entity on social media using entity sentiment information for each electronic document that indicates whether the entity is positively, neutrally, or negatively mentioned, based on the preliminary term vectors having terms determined to be in the received electronic documents and based on the industry-specific term vectors having terms determined to be in the received electronic documents, calculating a trust score for each trust factor based on how many terms in each trust factor term vector f can be matched to an entity summary term vector s and calculating a cosine similarity between the entity summary term vector s and the trust factor term vector according to the following:

$$\text{Score } (s, f) = \frac{V(s) \cdot V(f)}{|V(s)||V(f)|}.$$

16. The method of claim 15 wherein the calculating comprises calculating a polarized trust score by assigning a positive value to a trust score of an entity having a positive tone and by assigning a negative value to a trust score of an entity having a negative tone.

* * * * *